US005699067A

United States Patent [19]
Brown et al.

[11] Patent Number: 5,699,067
[45] Date of Patent: Dec. 16, 1997

[54] RADAR PLOT DISPLAY WITH LOW CPU LOADING

[75] Inventors: William Guy Brown, Fullerton; Christine N. Doan, Foothill Ranch, both of Calif.

[73] Assignee: Hughes Aircraft Company, Los Angeles, Calif.

[21] Appl. No.: 672,608

[22] Filed: Jun. 28, 1996

[51] Int. Cl.$^6$ ........................................... G01S 7/04
[52] U.S. Cl. ........................................ 342/176; 342/181
[58] Field of Search ........................ 342/176, 177, 342/178, 179, 181, 182, 185, 186, 197

[56] References Cited

U.S. PATENT DOCUMENTS

| | | | |
|---|---|---|---|
| 3,882,502 | 5/1975 | Peabody et al. | 342/176 |
| 4,833,475 | 5/1989 | Pease et al. | 342/185 |
| 5,374,932 | 12/1994 | Wyschogrod et al. | 342/36 |
| 5,519,618 | 5/1996 | Kastner et al. | 364/439 |

*Primary Examiner*—John B. Sotomayor
*Attorney, Agent, or Firm*—G. S. Grunebach; M. W. Sales; W. K. Denson-Low

[57] ABSTRACT

A high capacity radar plot display with low CPU loading. The display includes a display process (42) which controls a graphics window server (46) to render symbols on a display console by a "walking worm" animation. The current symbol plot as well as several symbol plot histories are sequentially displayed to render the animation. A plurality of color maps defining the colors of the current and plot histories are defined, with a clear color map to clear the display. The clear color map includes black (nonvisible) color for all the current and plot histories. The color map for the oldest plot history has a visible color assigned to the oldest history plot, with all other plot histories and the current plot still in black. Successive color maps for the remaining plot histories and the current plot, from the next oldest to the current plot, have progressively more plot histories in a visible color. To render the walking worm animation, the window graphics engine loads successive ones of the color maps into the off screen memory to use in successive draw operations. By toggling the color map selection from the oldest history plot to the current plot color map, which defines all plot histories and current plot in a visible color, the walking worm animation is achieved.

8 Claims, 10 Drawing Sheets

FIG. 2.
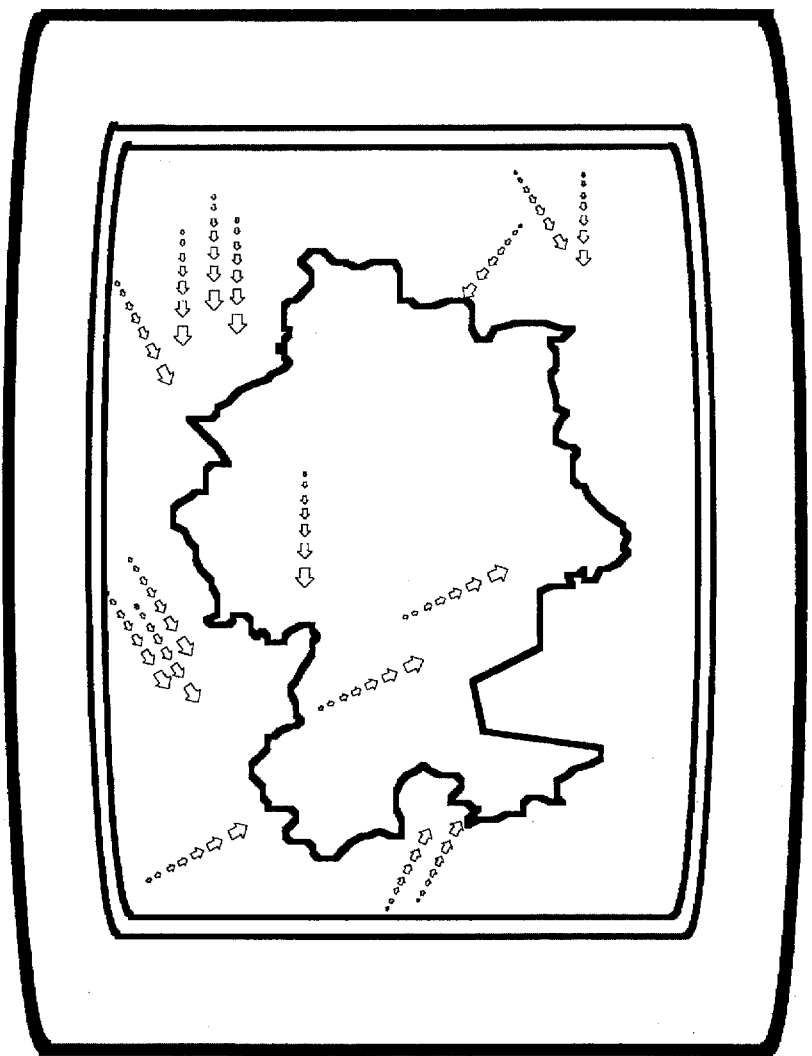
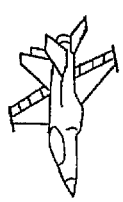
RADAR RETURN-RANGE,ALTITUDE AND BEARING TO TARGET
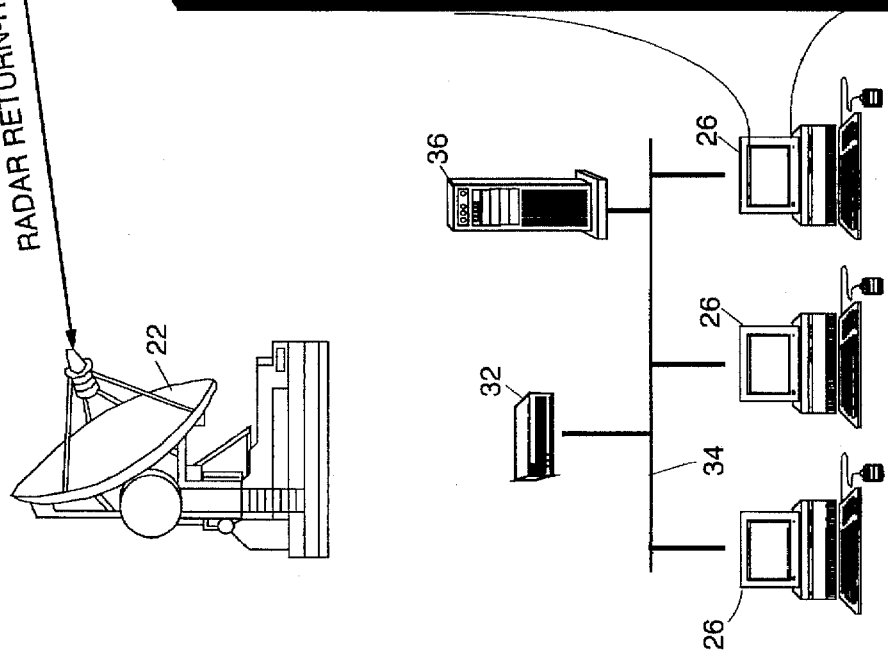

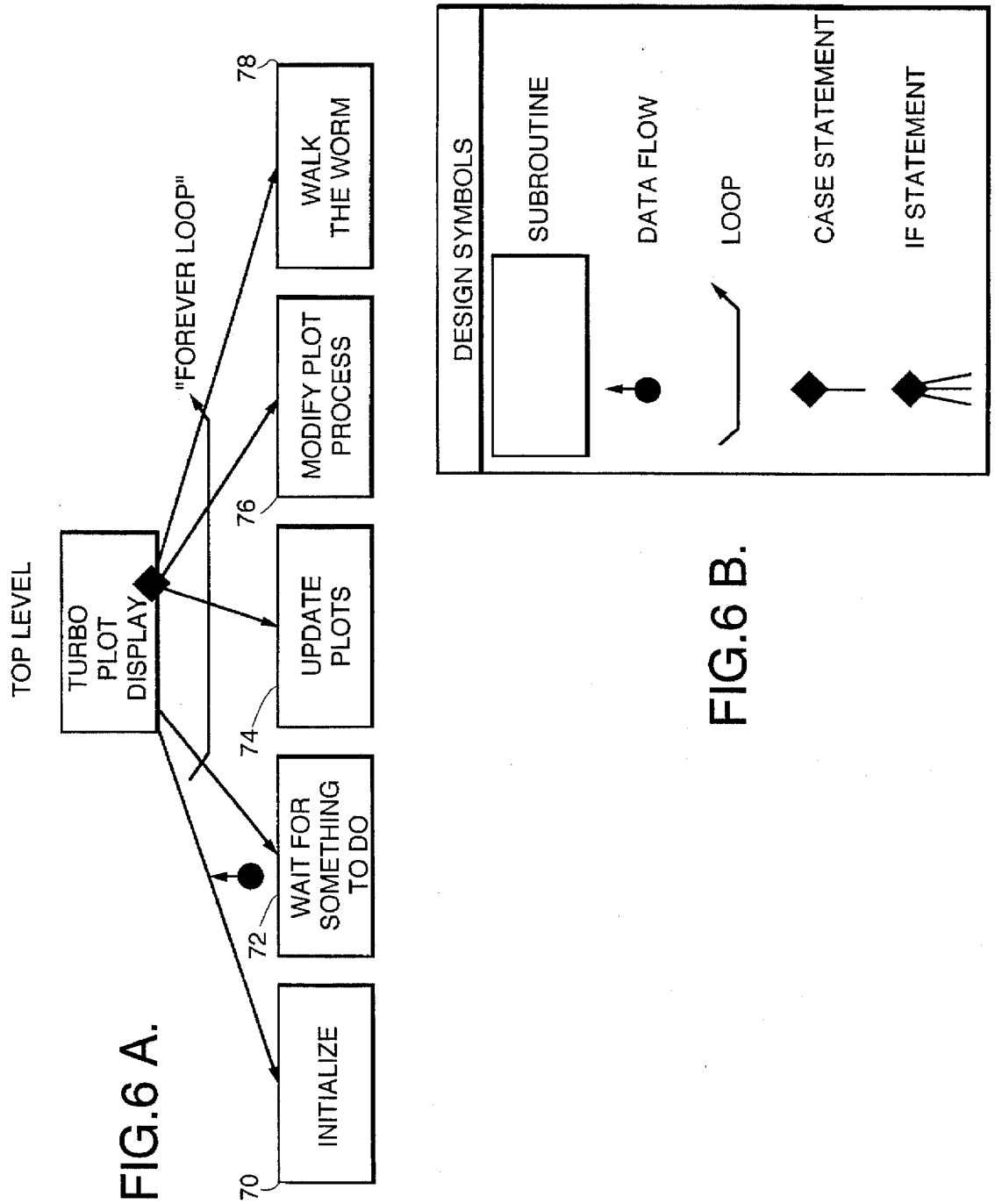

| CLEAR 50 | |
|---|---|
| 0 | Default RGB |
| 1 | Default RGB |
| 2 | |
| ... | |
| 32 | BLACK |
| ... | Default RGB |
| 64 | BLACK |
| ... | Default RGB |
| 96 | BLACK |
| ... | Default RGB |
| 128 | BLACK |
| ... | Default RGB |
| 160 | BLACK |
| ... | Default RGB |
| 192 | BLACK |
| ... | Default RGB |
| 224 | BLACK |
| ... | Default RGB |
| 256 | |

FIG. 7A.

| HISTORY 6 52 | |
|---|---|
| 0 | Default RGB |
| 1 | Default RGB |
| 2 | |
| ... | |
| 32 | BLACK |
| ... | Default RGB |
| 64 | BLACK |
| ... | Default RGB |
| 96 | BLACK |
| ... | Default RGB |
| 128 | BLACK |
| ... | Default RGB |
| 160 | BLACK |
| ... | Default RGB |
| 192 | BLACK |
| ... | Default RGB |
| 224 | H6 COLOR |
| ... | H6 COLOR |
| 256 | H6 COLOR |

FIG. 7B.

| HISTORY 5 54 | |
|---|---|
| 0 | Default RGB |
| 1 | Default RGB |
| 2 | |
| ... | |
| 32 | BLACK |
| ... | Default RGB |
| 64 | BLACK |
| ... | Default RGB |
| 96 | BLACK |
| ... | Default RGB |
| 128 | BLACK |
| ... | Default RGB |
| 160 | BLACK |
| ... | Default RGB |
| 192 | H5 COLOR |
| ... | H5 COLOR |
| 224 | H5 COLOR |
| ... | H6 COLOR |
| 256 | H6 COLOR |

FIG. 7C.

| HISTORY 1 62 | |
|---|---|
| 0 | Default RGB |
| 1 | Default RGB |
| 2 | |
| ... | |
| 32 | BLACK |
| ... | Default RGB |
| 64 | H1 COLOR |
| ... | H1 COLOR |
| 96 | H2 COLOR |
| ... | H2 COLOR |
| 128 | H3 COLOR |
| ... | H3 COLOR |
| ... | H3 COLOR |
| 160 | H4 COLOR |
| ... | H4 COLOR |
| 192 | H5 COLOR |
| ... | H5 COLOR |
| 224 | H5 COLOR |
| ... | H6 COLOR |
| 256 | H6 COLOR |

FIG. 7D.

| HISTORY 5 (CURRENT) 64 | |
|---|---|
| 0 | Default RGB |
| 1 | Default RGB |
| 2 | |
| ... | |
| 32 | H0 COLOR |
| ... | H0 COLOR |
| ... | H0 COLOR |
| 64 | H1 COLOR |
| ... | H1 COLOR |
| ... | H1 COLOR |
| 96 | H2 COLOR |
| ... | H2 COLOR |
| 128 | H3 COLOR |
| ... | H3 COLOR |
| 160 | H4 COLOR |
| ... | H4 COLOR |
| ... | H4 COLOR |
| 192 | H5 COLOR |
| ... | H5 COLOR |
| 224 | H6 COLOR |
| ... | H6 COLOR |
| 256 | H6 COLOR |

FIG. 7E.

RADAR PLOT DISPLAY WITH LOW CPU LOADING

TECHNICAL FIELD OF THE INVENTION

The present invention relates to plot displays, and more particularly to plot displays utilizing "walking-worm" displays with low CPU loading.

BACKGROUND OF THE INVENTION

A preferred application for the invention is in air defense ground environment (ADGE) radar plot display systems. These systems process radar data from one or more radar data links. The display requirements will vary, depending on the requirements of particular applications, but typically an ADGE system requires a continuous display of more than 3,000 current radar returns plus up to six history returns for each current return, totaling more than 21,000 plot symbols. A display technique known as "walking-worm" animates the presentation of radar data to the operator. The "walking-worm" is performed in a cyclic manner, processed in time at a constant rate from the oldest history to the most recent. The "walking-worm" permits operators to distinguish data forming coherent moving patterns representative of aircraft from non-coherent moving patterns representative of radar noise returns.

The presentation cycle of the "walking-worm" typically varies from one to three seconds. At fixed intervals, the radar data is cleared and re-drawn from oldest history return to the current return. In conventional display systems, the plot display cycle is very CPU (computer processing unit) intensive, resulting in excessive CPU resource consumption and, at times, erratic (jumpy) behavior of the radar display. The conventional display algorithm will typically perform the following steps in displaying the "walking-worm": (1) clear the display, (2) draw the oldest visible radar return to background display memory, (3) swap background memory into view, (4) add (draw) the next oldest visible radar returns to background memory, and (5) swap background into view, and so on, until all history plots and current plots are rendered. All visible symbols are re-drawn every update cycle (typically 3 seconds), and the display load (CPU utilization) peaks during this interval.

It would therefore represent an advance in the art to provide a system which places substantially lower loading on the display system CPU. This would permit the use of commercially available display console equipment, and eliminate the need for special one-of-a-kind equipment.

SUMMARY OF THE INVENTION

A method is described for display of radar data on a display console to achieve a walking worm animation of current and historical radar return data for a particular target. The display console includes a frame buffer including display refresh data comprising display pixel values defining index values to color map table locations, the color map table locations determining the color that is displayed on the display console for the corresponding pixel locations. The method comprising the following steps:

collecting radar return data for a particular target over successive radar frames, and associating radar return data for the target collected in a current time frame in a current plot data group, and radar return data for the target collected in one or more prior radar frames in one or more corresponding history plots data groups;

using said current and said one or more corresponding history data groups to form a current plot color map table and one or more history plot color map tables, each of said color map tables having table locations assigned to the current plot and to said one or more history plots, and wherein the current plot color map table locations for the current plot and all history plots contain corresponding visible color data, and wherein said one or more history plot color map tables have assigned to said current plot locations a non-visible color;

during a display rendering cycle, and without redrawing the contents of the frame buffer, selecting the oldest of said history plot color map tables for use with said frame buffer, and refreshing the display console by use of the contents of said frame buffer and said oldest history color map tables for a predetermined time interval, thereafter selecting the next oldest of the history plot color map tables for use with the frame buffer and refreshing the display console by use of the contents of the frame buffer and said next oldest history plot color map table for a predetermined time interval, and repeating said selection and refresh of said display using progressively more current history color map tables, thereafter selecting said current plot color map table for use with said frame buffer and refreshing said console display by use of the contents of the frame buffer and said current plot color map table for a predetermined time to complete said cycle.

In accordance with another aspect of the invention, a radar display system is described for display of radar data on a display console to achieve a walking worm animation of current and historical radar return data for a particular target. The system a display console including a frame buffer including display refresh data comprising display pixel values defining index values to color map table locations. The color map table locations determine the color that is displayed on the display console for the corresponding pixel locations during display refresh. The system further includes means for collecting radar return data for a particular target over successive radar frames, means for associating radar return data for the target collected in a current time frame in a current plot data group, and for associating radar return data for the target collected in one or more prior radar frames in one or more corresponding history plots data groups.

A current plot color map table and one or more history plot color map tables are formed from the radar return data, each having table locations assigned to the current plot and to said one or more history plots. The current plot color map table locations for the current plot and all history plots contain corresponding visible color data. The one or more history plot color map tables have assigned to the current plot locations a non-visible color. The system includes means operable during a display rendering cycle for sequentially selecting one of the color map tables, from the oldest of the history plot color map tables to the current plot color map table, for use with the frame buffer to refresh the display console by use of the contents of the frame buffer and the selected color map tables each for a predetermined time interval to complete the cycle. During the display rendering cycle, the contents of the frame buffer remain unchanged to reduce display processor loading while achieving the animation.

BRIEF DESCRIPTION OF THE DRAWING

These and other features and advantages of the present invention will become more apparent from the following detailed description of an exemplary embodiment thereof, as illustrated in the accompanying drawings, in which:

FIG. 2 is a representation of the data flow through various elements of the air space management system.

FIG. 6A is a top level flow diagram of a plot display algorithm in accordance with the invention.

FIG. 6B is a legend of symbols for the flow diagrams of FIG. 6A.

FIGS. 7A–7E illustrate the different color maps for one symbol.

DETAILED DESCRIPTION OF THE PREFERRED EMBODIMENT

Figure 1:
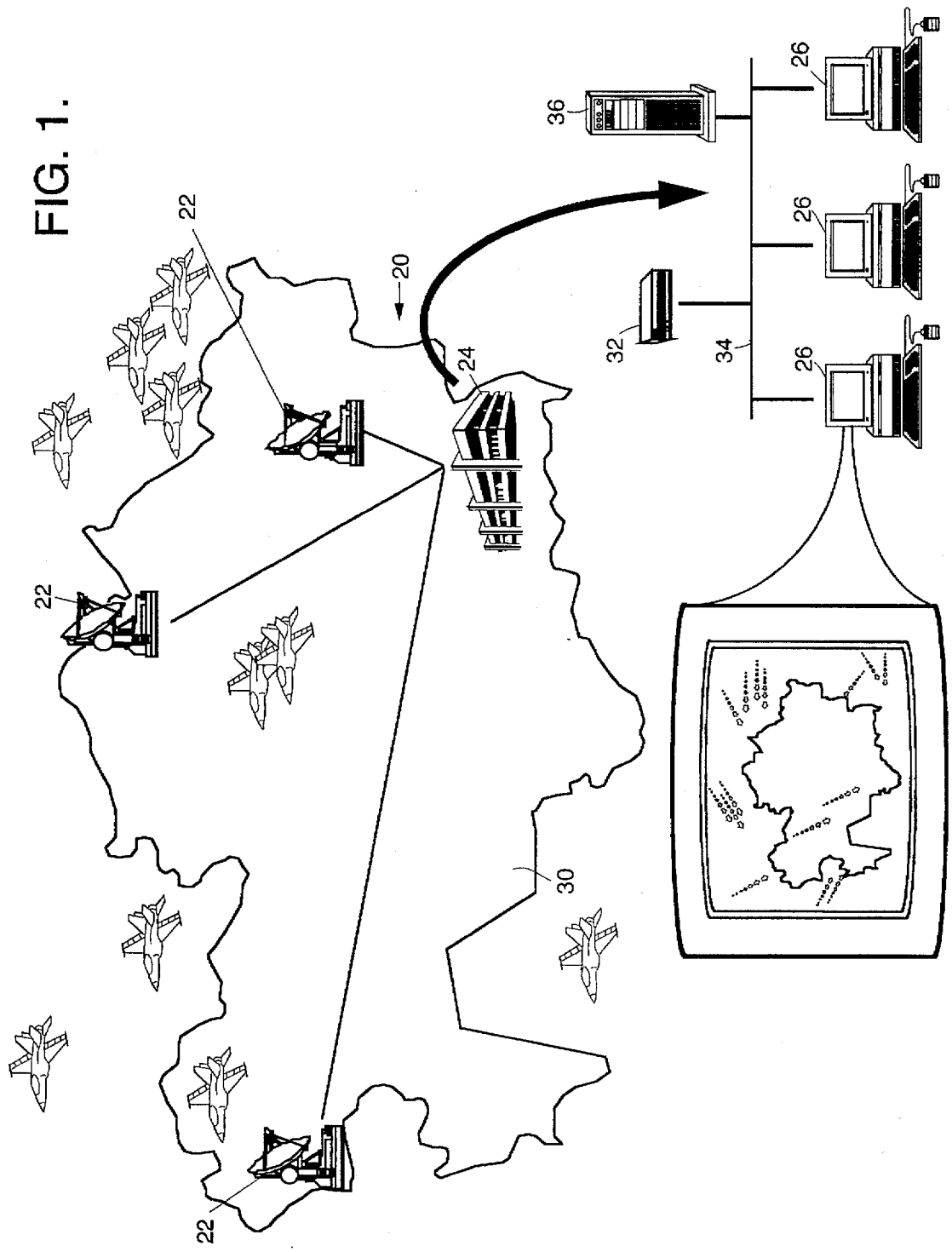
FIG. 1 shows in schematic form an air space management system with the display system of the present invention can be advantageously employed.

FIG. 1 shows in schematic form an air space management system 20 with which the display system of the present invention can be advantageously employed. The area 30 under surveillance has therein one or more radar heads or sensors 22. Radar data detected at the radar head(s) is routed to the Air Operations Center 24. At this facility, data from the radar is processed and displayed on operator display consoles 26 to air traffic control personnel to provide a "bird's eye" view of the air picture. Radar data displayed for the operator consists of current returns (those returns received during the last twelve seconds, say, in an exemplary application) and history returns (those returns received during the preceding six twelve second intervals). Typical air space management display capabilities range from 250 to 400+ radar reports received, processed, and displayed each second. This translates to 3,000 to 5,000 current plot symbols plus 18,000 to 30,000 history plot symbols.

FIG. 2 is a representation of the data flow through various elements of the air space management system. The radar sensors 22 detect the range (distance), altitude and bearing (direction) of airborne "targets" (aircraft) within the area 30 under surveillance. This information is feed to a protocol convertor, which then channels the data onto a local area network (LAN) 34. An air defense computer 36 is connected to the LAN, as are several operator display consoles 26. The radar returns are processed at the air defense computer, and presented to the air traffic control personnel via the display consoles 26. The presentation of radar data (plots) to the operator is very critical to ensure an accurate depiction of the air space status. This invention provides an efficient method of presenting the radar data to the operator.

Figure 3:
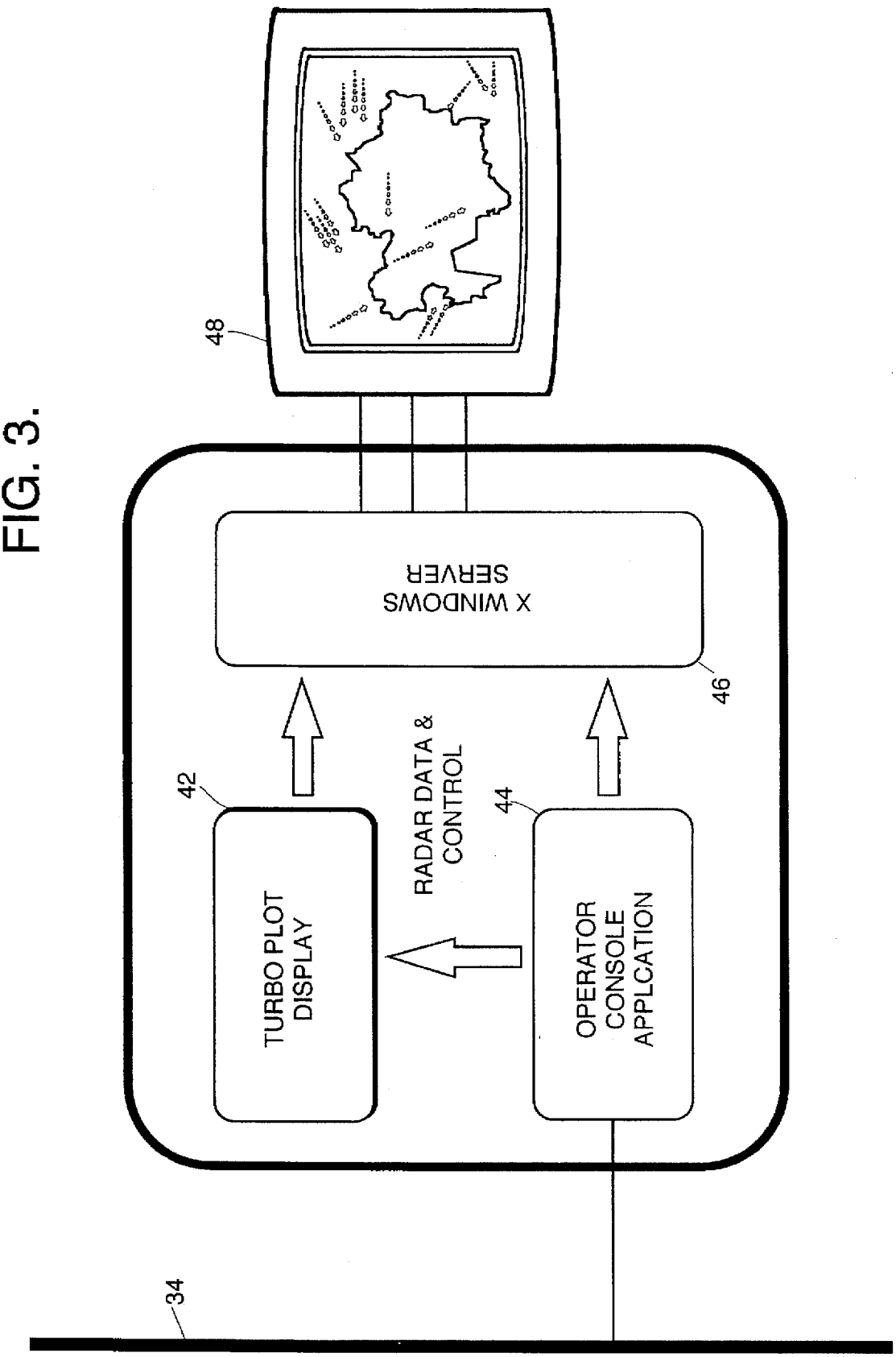
FIG. 3 is a simplified schematic illustration of the operator display console process architecture in accordance with one aspect of the invention.

FIG. 3 is a simplified schematic illustration of the operator display console process architecture in accordance with an aspect of the invention. The operator display console 26 in this exemplary embodiment includes a commercially available, UNIX-based high performance workstation 40, such as the Hewlett-Packard Model 735/125 Workstation (125MHz, PA-RISC CPU), with a Hewlett-Packard 8 Plane CRX, 256 colors, 1280×1024 resolution display generator and a raster scanned CRT display monitor 48 such as a Barco 29 inch high resolution monitor, model number ICD 774. The display algorithm according to this aspect of the invention is encapsulated into a single UNIX process, the "turbo plot display" process 42, which receives radar data and display control information from the Operator Control Application process 44. The display algorithm in turn interfaces with the X Windows server 46 to display and manage the presentation of radar data to the operator. The X Windows server 46 is a commercially available, graphics window engine developed by the Massachusetts Institute of Technology. The discussion herein will refer to several X Windows services.

Presentation of the radar data to the operator via the display console is accomplished through a technique known in the art as "walking-worm" animation. Radar data is drawn using symbols from a user-defined font loaded into the X Windows server 46. To depict speed and heading of airborne targets, the radar symbols are drawn periodically (typically every three seconds) from the oldest history position to the most current radar return. That is, on an adapted periodic cycle all radar plot symbols are cleared from the display, then on precise time intervals (usually 100 milliseconds) the radar returns comprising an entire history group are rendered until all history groups, plus the current group, are displayed. This results in "movement" of plot data that accurately depict speed and heading of aircraft, even in areas of high concentration of radar noise (clutter). Given the magnitude of typical system requirements which generally range from 21,000 to 35,000 current and history radar returns, the algorithm process in accordance with the invention provides a low cost and efficient solution to the demanding display requirements associated with radar data, which can now be achieved with relatively low cost commercial workstation equipment instead of the high cost, specially designed equipment required by other known systems.

It will be appreciated by those skilled in the art that the display hardware associated with display 48 will include conventional frame buffer memory 48A, into which data representing a frame of display information is loaded and thereupon retrieved to render (display) the corresponding display frame. This exemplary embodiment employs an eight plane display generator, as discussed above, and so the eight planes of data in the frame buffer collectively define a pixel value for each pixel location of the frame, the pixel value identifying a particular color cell in a color lookup table, known as a color map. The color cell contains intensity values for the primary color values. In this case the intensity values are represented by 8 bits, and so there are 256 possible values or colors in this exemplary embodiment. During operation, each pixel value in the visible portions of a window is continuously read out of the frame buffer and looked up in the color map. The RGB values in the specified color cell in the lookup table/color map control the intensity of the three primary colors and thus determine the color that is displayed on the display screen. See, e.g., Xlib Programming Manual, Adrian Nye, O'Reilly & Associates, Inc., 1988, page 174. It will also be understood that the 8 bit planes are arranged in a hierarchy to provide bits values ranging from a least significant bit to a most significant bit in the 8 bits which define the color value.

Figure 4:
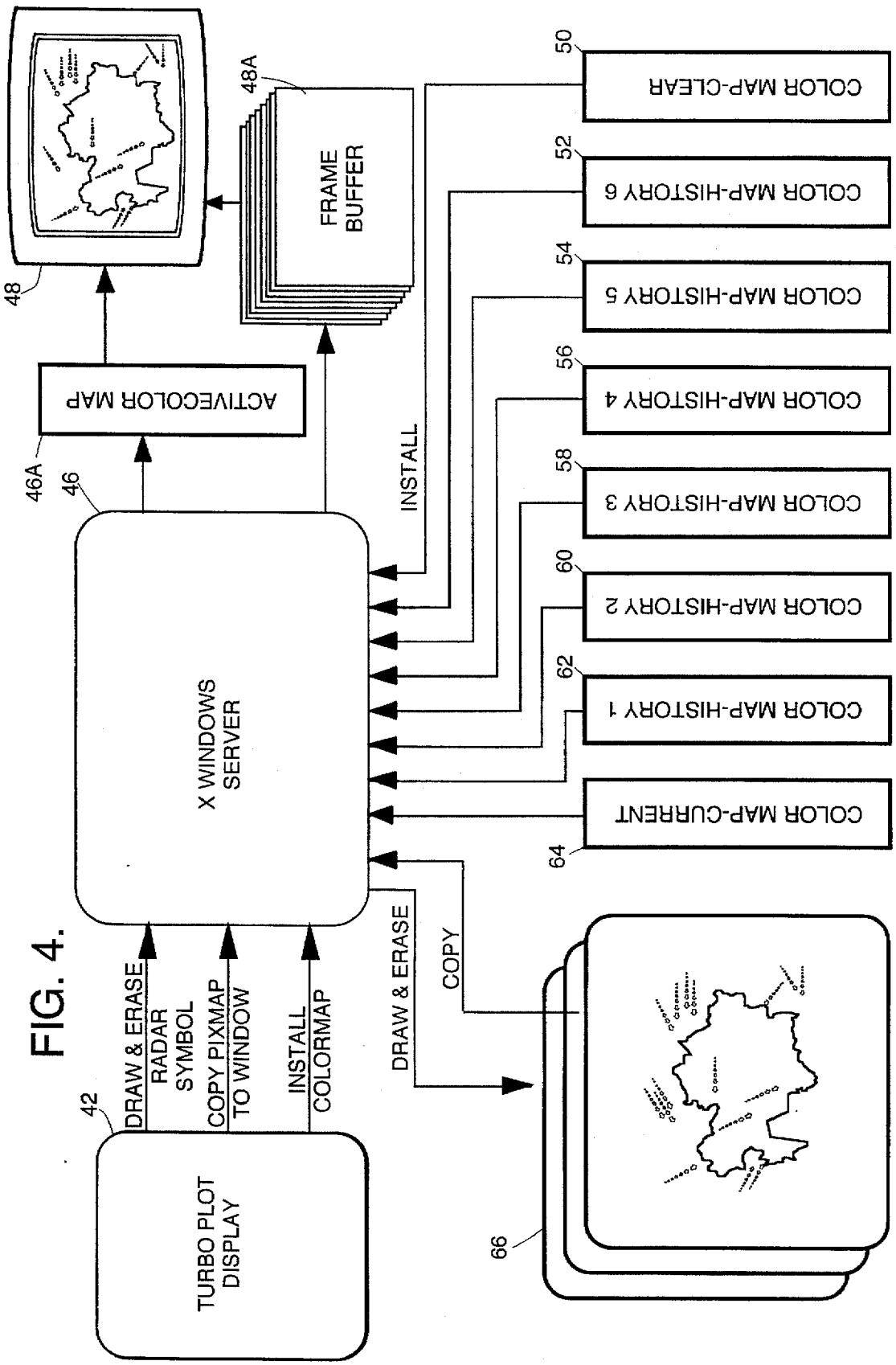
FIG. 4 is a schematic diagram illustrative of a display system embodying the invention.

The off screen memory 66 emulates the frame buffer 48A, in that it is for assembling and storing a representation of the eight planes of pixel data to represent a frame of display information. Use of the off screen memory enhances the quality of the display by preventing flicker which would result if data were written directly to the frame buffer, bypassing the off screen memory. According to an aspect of the invention, the five planes representing the 5 least significant bits for defining the color cell for each pixel location are dedicated to non-plot display information, and the top three planes representing the 3 most significant bits for defining the color cell for each pixel location are dedicated to plot data. Thus, the non-plot display information has a total of 32 possible color values, and the plot display information has a total of 224 possible color values. To achieve the "walking-worm" animation using commercial workstations, the following method is employed. It is to be recognized that the particular details of the method, such as the number of prior histories rendered, will vary depending on the requirements of a particular application. In this example, eight different X Windows color maps 50–64 (FIG. 4) are created, one color map 50 to "clear" all plot groups, color maps 52–62 for each of six plot history groups, and one color map 64 for the current plot group. These color maps 50–64 define what colors are active during the rendering of the "walking-worm." In addition, off-screen memory 66 (X Windows PIXMAP) is utilized to draw new plot symbols (current) and erase the oldest history plot symbols from the display.

During an initialization process, the off screen memory 66 is loaded with data representing each of the current and history data values for a given target, i.e. the current and history groups, as well as the non-plot data.

Figure 5:
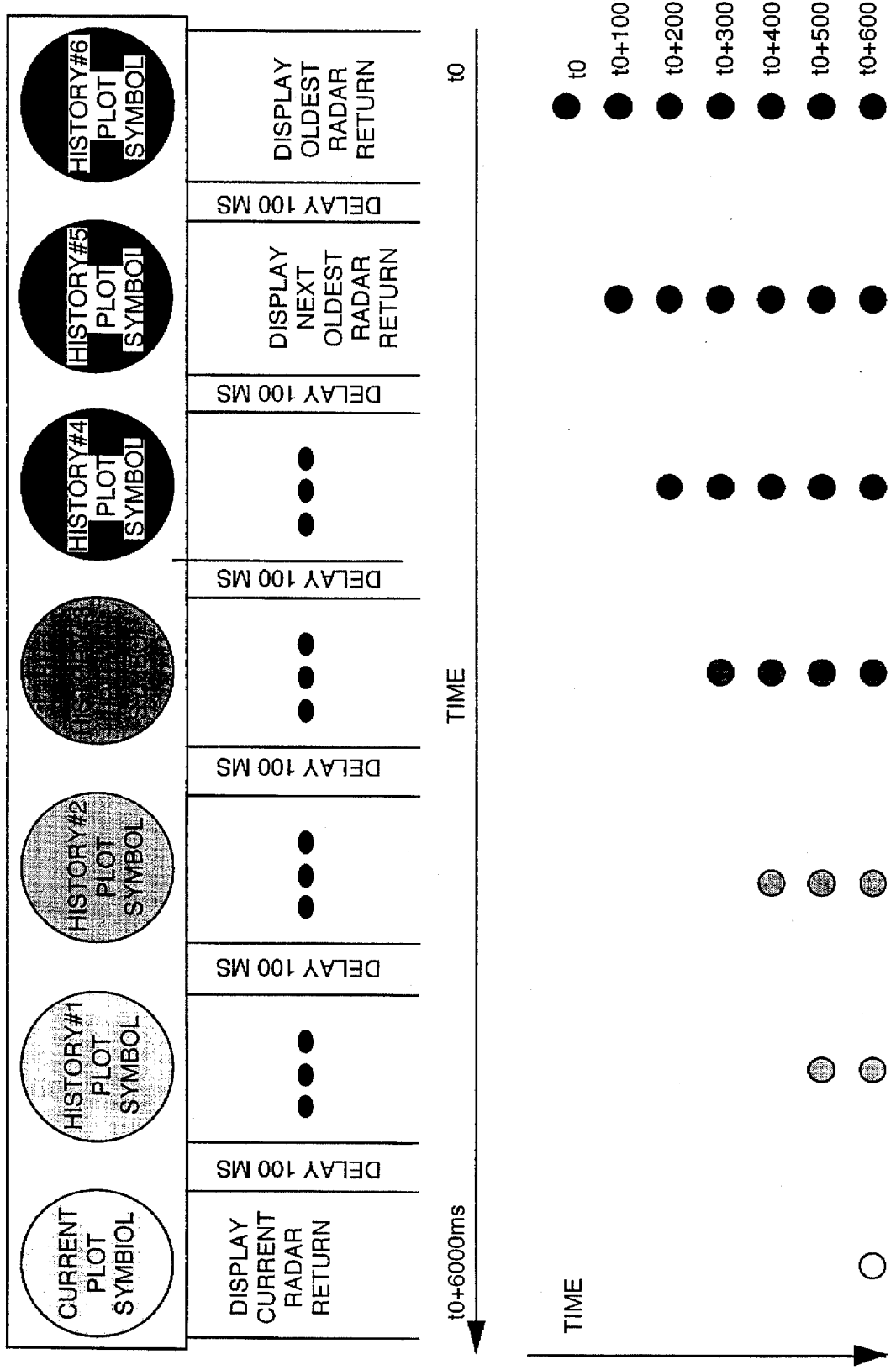
FIG. 5 is a diagrammatic depiction of the "walking worm" animation performed in accordance with the invention.

To render the "walking-worm," the CLEAR color map 50 is loaded to the memory 66 first, then the memory contents (PIXMAP) are copied to the frame buffer of display 48. At this point, all current and history plot symbols are present (drawn) on the display, but their color has been set to clear (black, not visible) by use of the clear color map 50 to establish the colors for the plot symbols. Now the "walking-worm" animation starts, as shown in FIG. 5. Simply by loading color map 52 (History 6) for display use as the active color map 46A, plot symbols comprising history group 6 appear. This is because color map 52 assigns a visible color to the pixel location corresponding to the history group 6, and assigns "clear" (black) to the pixel locations corresponding to history groups 5 and more recent, including the current data group. Thus, the address locations 32, 64, 96, 128, 160, 192 are assigned black as the color, and locations 224–256 are assigned a history group 6 color (H6 COLOR), as shown in FIG. 7B. After a 100 millisecond delay, color map 54 (History 5) is loaded for use as the active color map 46A employed to define the colors accessed by the frame buffer operation, at which point all plot symbols comprising history group 5 and 6 appear. This is because the color map 54 assigns visible colors to the pixel locations corresponding to history groups 5 (H5 COLOR, address locations 192–223) and 6 (H6 COLOR, address locations 224–256), and leaves clear the colors assigned to the pixel locations 32–191 corresponding to history groups 4 and more recent, as shown in FIG. 7C. This process continues, using in sequence color maps 56, 58, 60, 62 and 64 to establish the color values for each pixel location, until all history and current plot symbols are visibly displayed using color map 64.

Referring now to FIG. 6A, a top level flow diagram of the turbo plot display process 42 is illustrated; FIG. 6B is a legend of symbols used in the flow diagrams of FIG. 6A and 7–11. In this exemplary embodiment, the process 42 comprises five subroutines, identified as the "initialize" subroutine 70, the "wait for something to do" subroutine 72, the "update plot" subroutine 74, the "modify plot process" subroutine 76, and the "walk the worm" subroutine 78.

The initialize routine 70 includes the following steps. First, the subroutine gets the user parameters from the operator console application process 44. These parameters include the font, number of histories, the update cycle time, the number of categories and the category symbols. Plot categories define the attributes of the radar return. Typically, three categories are defined. The first category is "correlated or uncorrelated." A correlated plot means that this plot report is associated with a known airborne target. An uncorrelated plot means that a radar report has no association with an airborne target, and is usually associated radar noise such as heavy weather, sea waves, jamming hostile aircraft, hostile evading aircraft, and atmospheric conditions. The next category is "search or beacon." Search plots are strictly raw returns from the radar. That is, the radar transmits a signal and picks up the reflected return with no assistance provided by the aircraft being interrogated. Beacon plots involve radar returns reinforced by the aircraft itself, e.g. by transponders which identify the aircraft and report its altitude. The third category, the radar head category, identifies the radar head from which the plot report was received. Plot categories are used for display filtering; i.e., categorizing plots in this manner allows air traffic controllers to select what plot data is visible. For example, an operator may select to view only correlated, beacon returns from radar head Alpha, Bravo and Delta.

Next, the data structures needed for managing plot history groups are allocated and initialized; these data structures are used to "age" radar data from current group, to history group 1, to history group 2, and so on. The connection to the X-server 46 is opened. The X Graphic Context is created to define the font, color and plane mask, one for each history group, one for the present plot group, and one for clearing the display. Graphics operations can be restricted to affect only a subset of bit planes in a drawable. A plane mask is a bit mask describing which planes are to be modified. Plane masks are used in plot processing to separate the processing of radar data from other objects on the situation display, such as tracks, flight plans, maps, and the like. Using plane masks allows the turbo plot display process to independently render radar data on the display without affecting the processing (drawing) associated with the other objects (e.g. tracks). That is, plots can be rendered without redrawing the other objects on the display such as tracks and map lines, when plane masks are used.

Next, the color maps 50–64 are created and loaded in the X Windows server, one color map 52–62 for each history group, one color map 64 for the present group, and one color map 50 for clearing the display. The final step in the initialize subroutine is to initialize the World Coordinate Window services. Display data received at the operator display consoles 26 from the air defense computer 36 in this embodiment uses the Cartesian world coordinates system to define the position of a given object. X Windows does not use the Cartesian world coordinates, but rather Device coordinates, which are similar to cartesian world coordinates except that the Y axis directions are reversed. Thus, the services being initialized are those need to convert from world coordinates to X Window device coordinates.

FIGS. 7A–7E illustrate contents of the different color maps for one symbol; these color maps are extended for each of the other symbols to be rendered. For this example, a total of eight color maps are defined. These color maps are toggled in sequence, from map 52 to map 64, during the display rendering cycle to achieve the "walking worm" animation. FIG. 7A illustrates a clear color map 50, wherein all plot symbol color cell locations 32–255 are assigned the black color. The color map 52 in FIG. 7B is a sixth history color map. The color map 54 in FIG. 7C is the fifth history color map, and so on, with the fourth, third and second color maps not shown in FIG. 7. The color map 62 in FIG. 7D is a first history color map, and FIG. 7E shows a current color map 64.

The color maps 50–64 include address locations 0–255 in this example, with particular color data stored in corresponding memory locations or color cells. Address locations 0–31 are reserved for non-plot symbol data. The locations 32, 64, 96, 128, 160, 224 and 256 in each of the color maps 50–64 store data for the corresponding current, first, second, third, fourth, fifth and sixth history data values for the symbol. In addition, when a particular history group is active (visible), intervening RGB values are also set to the associated history color. For example, FIG. 7E shows the color map used for the current history group, which renders not only the current plot symbol in a current color (H0 COLOR), but each of the prior six history plot values in corresponding visible colors (H1 COLOR-H6 COLOR). In FIG. 7E, the RGB values range from 32–63, 64–95, 96–127, 128–159, 160–191, 192–223, 224–256, and correspond to current, first, second, third, fourth, fifth and sixth history groups. The RGB value for a particular history group spans over a range of color map addresses because, the turbo plot display process 42 uses a plane mask when rendering radar data. That is, when a plot symbol (target return) intersects a non-plot object (e.g. map line) on the display, the color of the plot symbol will supersede the color of the non-plot object. If the color map were not loaded in this manner, the color visible at the intersection would be undefined and not the desired plot color. Other examples of non-plot data include tracks, cities/landmarks, and latitude/longitude lines.

Plot rendering starts by "clearing" the display and copying background display memory (X PIXMAP) to the visible window, i.e. the display frame buffer. To "clear" the display, the X Window server 46 is directed to load the CLEAR color map 50 for use with the frame buffer. All colors associated with plot symbols are now set to BLACK (or clear). Next, the plot process 42 suspends for a precise period (typically 100 ms), (with the display being refreshed at its conventional refresh rate, typically 60 Hz, during this suspense period) as also illustrated in FIG. 5, at which time it directs the X server 46 to load the sixth history color map 52 (FIG. 7B) for use with the frame buffer, making only the plot symbols associated with the sixth history visible. The process 42 again suspends for the precise period, and then next loads the color map 54 (FIG. 7C) associated with the fifth history, making both plot symbols for the fifth and sixth history visible. This process continues until all remaining history groups and the current plot group is visible. Simply by toggling color maps for use by the display frame buffer at precise intervals, the animated "walking worm" results.

X draw primitives are not issued during the rendering cycle. The X Windows systems supplies the application programmer a run-time library (called Xlib) of subroutines to manipulate the display. Xlib consists of over 300 routines which are broken up into more than 35 functional groups. One functional group is "Drawing Primitives" which include run-time routines to do such things as draw an arc (XDrawArc), draw a line (XDrawLine), area fill a rectangle (XFillRectangle), and draw a symbol (XDrawText). The turbo plot display process 42 during the rendering cycle does not make use of any Xlib draw primitives, such as XDrawText, thereby greatly reducing CPU loading during the rendering cycle.

Figure 8:
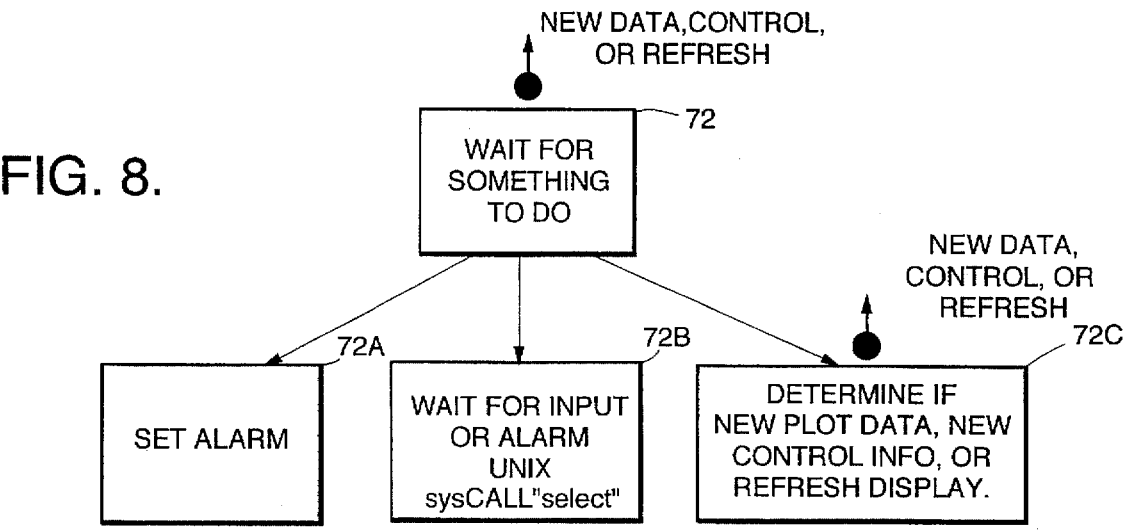
FIG. 8 is a simplified flow diagram illustrating the "wait for something to do" subroutine comprising the algorithm of FIG. 6.

FIG. 8 is a simplified flow diagram illustrating the "wait for something to do" subroutine 72. The initial step is the "setAlarm" step 72A, where the user sets the "walking worm" cycle period, typically 3 seconds. Next, the subroutine waits (step 72B) for input or "Alarm" (expiration of a cycle), using the UNIX "select" system service. "Select" is a common UNIX run-time service to allow a process to suspend (stop) until an event occurs, such as data is available, for processing or a time period has expired (alarm). The subroutine then determines (step 72C) if new plot data, new control information, or refresh display has been received, and returns this information to the turbo plot display process 42.

Figure 9:
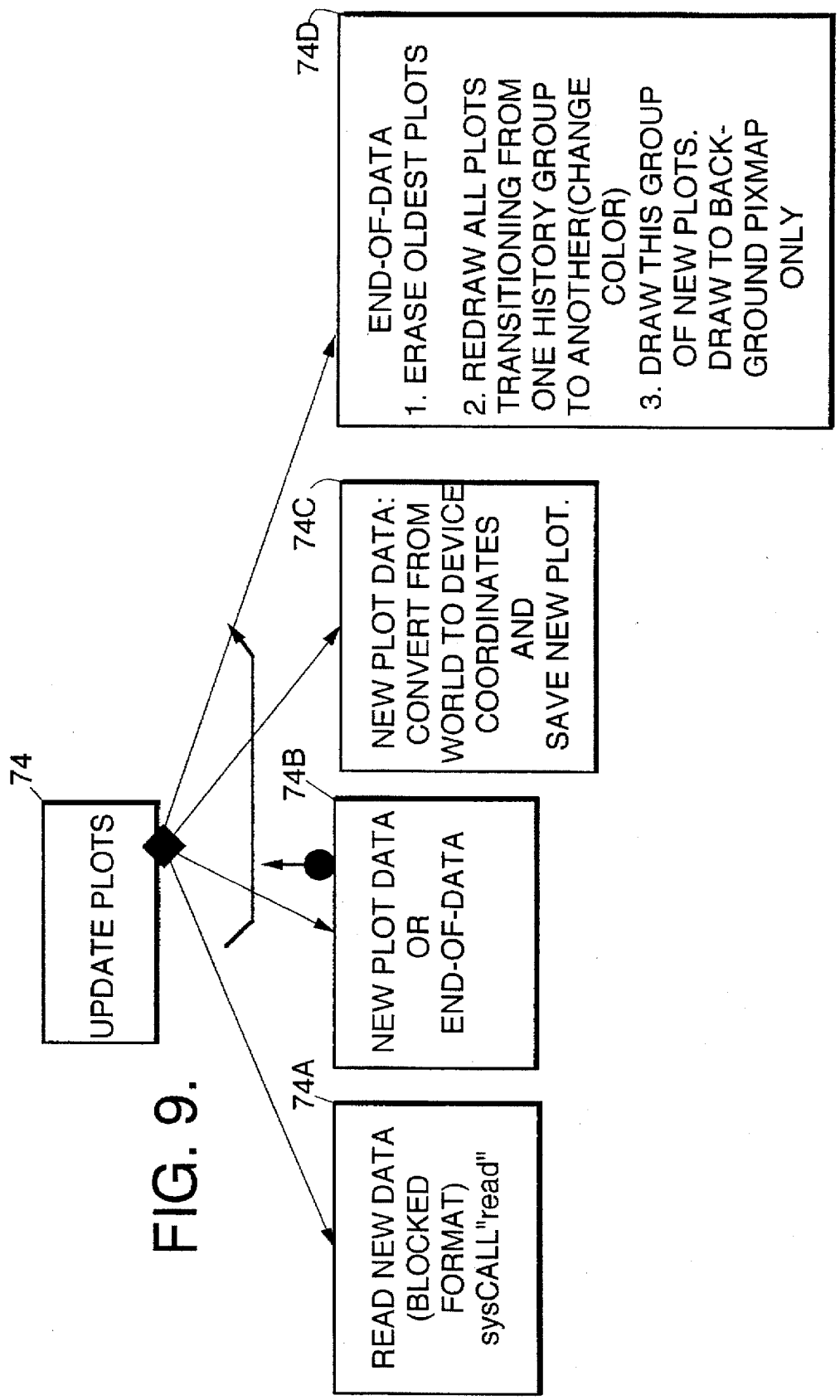
FIG. 9 illustrates the "update Plots" subroutine comprising the algorithm of FIG. 6.

FIG. 9 illustrates the "update Plots" subroutine 74 in further detail. This subroutine updates the plot in the following manner. For the example of six history plots and one current plot, 84 sets or "buckets" of plot data are defined, i.e. seven groups of twelve. Each "bucket" of data represents the radar return data collected during one second by all the radar sensor heads 22 comprising the system. In this embodiment, the radar system has a frame time of 12 seconds, i.e. the system collects an entire frame of radar data covering the area 30 under surveillance once every 12 seconds, analogous to the radar scan time. Thus, each frame of radar data includes 12 "buckets" of data, and since there are seven plots per symbol, there are a total of 84 "buckets" of data. The "updatePlots" subroutine 74 processes each new "bucket" of plots after its receipt during the preceding second. The oldest "bucket" (#84) is erased since it is aged out. All "buckets" transitioning from one history group to another (such as #72 becoming #73) are redrawn to change its color. Finally, the newest "bucket" is added to a circular buffer structure and drawn. So, under a typical load of 3,000 current plots plus 18,000 history plots and an update rate of one "bucket" per second (250 plot reports), only eight of the 84 "buckets" require updating.

The initial step 74A (FIG. 9) is to read the new data, and perform a UNIX sysCall "read" function. The new plot data or end-of-data is received (step 74B), converted from world to device coordinates, and saved as a new plot (step 74C). Next, at the end-of-data (step 74D), the oldest plots are erased, all plots are redrawn, transitioning from one history group to another (i.e. change color), and this group of new plots is drawn to the off screen memory 66 only.

Figure 10:
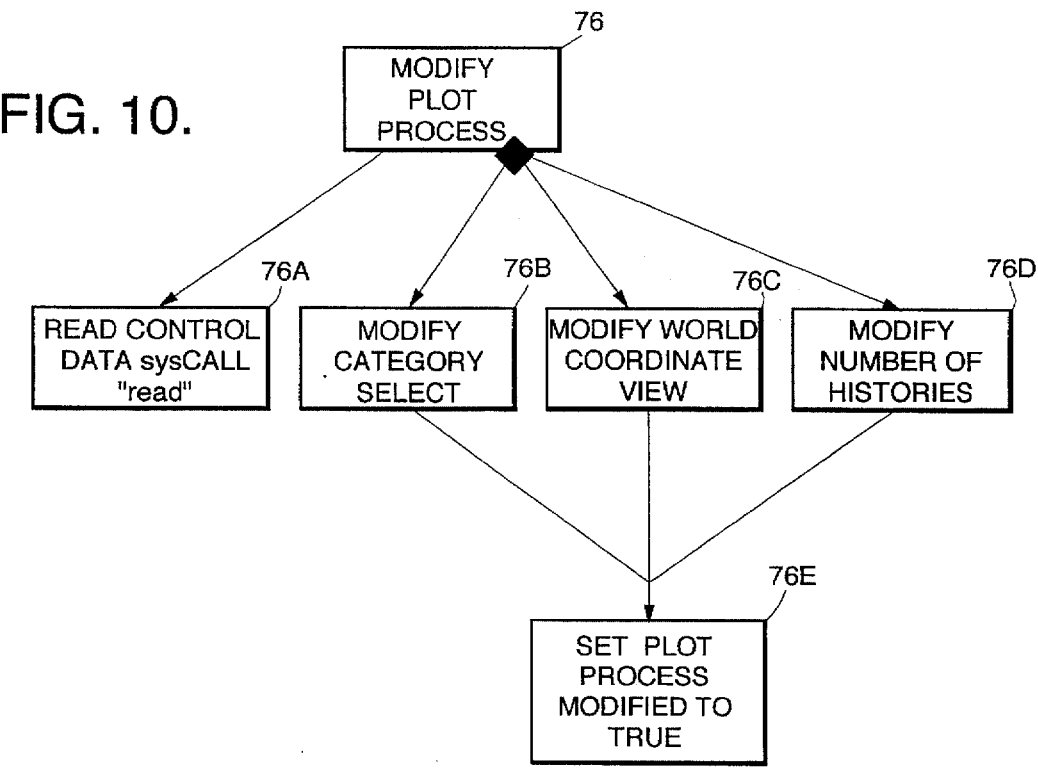
FIG. 10 illustrates in further detail the "modifyPlot process" subroutine comprising the algorithm of FIG. 6.

FIG. 10 illustrates in further detail the "modifyPlot process" subroutine 76 of FIG. 6. This subroutine permits the user to modify the parameters of the plot process. The initial step (76A) is to read the control data, and perform a UNIX sysCall "read" function. The user can select and modify the category (76B), World Coordinate view (step 76C) or number of histories (step 76D) to be displayed. The modified plot process control data is then saved (step 76E).

Figure 11:
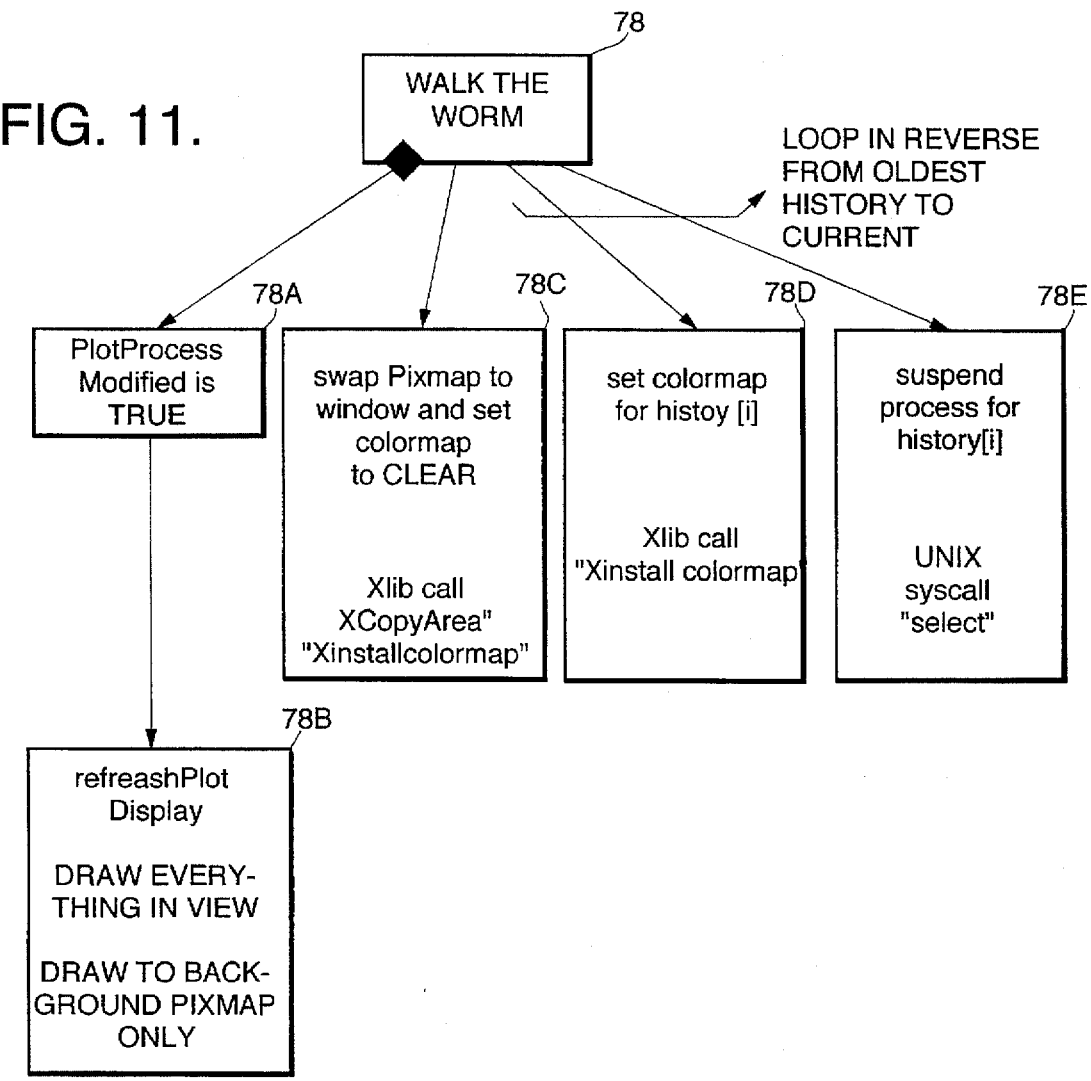
FIG. 11 illustrates the "walk the Worm" subroutine comprising the algorithm of FIG. 6.

FIG. 11 illustrates the "walk the Worm" subroutine 78 in further detail. The initial step (78A) is to use the modified set of control data, and, to refresh (78B) the plot display, only if the PlotProcess was changed (e.g. the operator has selected a new category of plots to display), by drawing everything in view to the off screen memory 66 (PIXMAP) only. The next step 78C is to swap the contents of the off screen memory 66 Pixmap to Window, i.e. to copy the Pixmap stored in memory 66 to the display hardware frame buffer, and set the color map to the Clear color map 50. This is done in this exemplary embodiment by executing two X windows run-time routines, "XCopyArea" and "XInstallColormap." "XCopyArea" copies (swaps) the contents of the offscreen memory 66 to the frame buffer (visible display). "XInstallColormap" directs the X server to use a different color map (50) thereby making all plot symbols invisible (clear). The next two steps are performed in a loop, in reverse from the oldest history color map to the current color map. At step 78D, the color map is set to history (i), by performing the X Window function "XInstall Colormap." At step 78E, the process is suspended for history (i) for the precise time duration (typically 100 ms), by performing the UNIX function sysCall "select." The process then loops back to step 78D to set the color map to thenext history group, and so on.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for display of radar data on a display console to achieve a walking worm animation of current and historical radar return data for a particular target, the display console including a frame buffer including display refresh data comprising display pixel values defining index values to color map table locations, the color map table locations determining the color that is displayed on the display console for the corresponding pixel locations, the method comprising the following steps:

collecting radar return data for a particular target over successive radar frames, associating radar return data for the target collected in a current time frame in a current plot data group, and associating radar return data for the target collected in one or more prior radar frames in one or more corresponding history plots data groups;

using said current and said one or more corresponding history data groups to form a current plot color map table and one or more history plot color map tables, each of said color map tables having table locations assigned to the current plot and to each of said one or more history plots, and wherein the current plot color map table locations for the current plot and all history plots contain corresponding visible color data, and wherein said one or more history plot color map tables have assigned to said current plot locations a non-visible color;

during a display rendering cycle, and without redrawing the contents of the frame buffer, selecting the oldest of said history plot color map tables for use with said frame buffer, and refreshing the display console by use of the contents of said frame buffer and said oldest history color map tables for a predetermined time interval, thereafter selecting the next oldest of the history plot color map tables for use with the frame buffer and refreshing the display console by use of the contents of the frame buffer and said next oldest history plot color map table for a predetermined time interval, and repeating said selection and refresh of said display using progressively more current history color map tables, thereafter selecting said current plot color map table for use with said frame buffer and refreshing said console display by use of the contents of the frame buffer and said current plot color map table for a predetermined time to complete said cycle.

2. The method of claim 1 further comprising the steps of preparing a clear color map table, wherein non-visible colors are assigned to each pixel location corresponding to a current target plot or history target plot, and initializing said display prior to commencement of said display rendering cycle, said initializing step including the step of selecting said clear color map table for use with the contents of said frame buffer and using said frame buffer contents and said clear color map table to refresh said display console for a time interval prior to commencement of said display rendering cycle, wherein all current target plot and history plot symbols are rendered in non-visible colors.

3. The method of claim 2 wherein said non-visible colors include black.

4. The method of claim 1 further characterized in that at least two prior radar frames are employed, and at least two corresponding history plot color map tables are formed, and wherein the oldest of said history color map tables corresponding to the oldest of said prior radar frames contains visible color data for the pixel locations corresponding to the oldest history plots, and non-visible color data for the pixel locations corresponding to the most recent history plots and the current plots, wherein use of said oldest history color map table result in visible rendering of the oldest history plots and non-visible rendering of the newer history plots and the current plots, and the newest of said history color map tables corresponding to the newest of the prior radar frames contains visible color data for the pixel locations corresponding to all history plots and non-visible color data for the pixel locations corresponding to the current plots, wherein use of said newest history color map tables results in visible rendering of all history plots and non-visible rendering of all current plots.

5. The method of claim 4 wherein at least six history color map tables are formed, corresponding to at least six prior radar frames.

6. A radar display system for display of radar data on a display console to achieve a walking worm animation of current and historical radar return data for a particular target, the system comprising:

a display console including a frame buffer including display refresh data comprising display pixel values defining index values to color map table locations, the color map table locations determining the color that is displayed on the display console for the corresponding pixel locations during display refresh;

means for collecting radar return data for a particular target over successive radar frames, means for associating radar return data for the target collected in a current time frame in a current plot data group, and for associating radar return data for the target collected in one or more prior radar frames in one or more corresponding history plots data groups;

a current plot color map table and one or more history plot color map tables, each of said color map tables having table locations assigned to the current plot and to said one or more history plots, and wherein the current plot color map table locations for the current plot and all history plots contain corresponding visible color data, and wherein said one or more history plot color map tables have assigned to said current plot locations a non-visible color; and means operable during a display rendering cycle for sequentially selecting one of said color map tables, from the oldest of said history plot color map tables to the current plot color map table, for use with said frame buffer to refresh the display console by use of the contents of said frame buffer and said selected color map tables each for a predetermined time interval to complete said cycle, and wherein during said display rendering cycle said contents of said frame buffer remain unchanged to reduce display processor loading while achieving said animation.

7. The display system of claim 6, further comprising a clear color map table, wherein non-visible colors are assigned to each pixel location corresponding to a current target plot or history target plot, and means for initializing said display prior to commencement of said display rendering cycle to select said clear color map table for use with the contents of said frame buffer and to refresh said display console for a time interval prior to commencement of said display rendering cycle, wherein all current target plot and history plot symbols are rendered in non-visible colors prior to commencement of said display rendering cycle.

8. The display system of claim 6 further characterized in that at least two prior radar frames are employed, and comprising at least two corresponding history plot color map tables, and wherein the oldest of said history color map tables corresponding to the oldest of said prior radar frames contains visible color data for the pixel locations corresponding to the oldest history plots, and non-visible color data for the pixel locations corresponding to the most recent history plots and the current plots, wherein use of said oldest history color map table result in visible rendering of the oldest history plots and non-visible rendering of the newer history plots and the current plots, and the newest of said history color map tables corresponding to the newest of the prior radar frames contains visible color data for the pixel locations corresponding to all history plots and non-visible color data for the pixel locations corresponding to the current plots, wherein use of said newest history color map tables results in visible rendering of all history plots and non-visible rendering of all current plots.

\* \* \* \* \*